US010976835B2

(12) United States Patent
Hori et al.

(10) Patent No.: US 10,976,835 B2
(45) Date of Patent: Apr. 13, 2021

(54) OPERATION INPUT DEVICE

(71) Applicant: MITSUBISHI ELECTRIC CORPORATION, Tokyo (JP)

(72) Inventors: Atsushi Hori, Tokyo (JP); Yuichi Sasaki, Tokyo (JP); Daisuke Kisara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/831,077

(22) Filed: Mar. 26, 2020

(65) Prior Publication Data

US 2020/0225765 A1 Jul. 16, 2020

Related U.S. Application Data

(63) Continuation of application No. PCT/JP2017/036778, filed on Oct. 11, 2017.

(51) Int. Cl.
*G06F 3/03* (2006.01)

(52) U.S. Cl.
CPC ...................... *G06F 3/03* (2013.01)

(58) Field of Classification Search
CPC ...... G06F 3/0362; G06F 3/044; G06F 3/0312; G06F 3/03547; G06F 3/016; G06F 3/0393; G09G 5/10; G09G 2360/145; G09G 2354/00; G09G 2330/02
See application file for complete search history.

(56) References Cited

U.S. PATENT DOCUMENTS

| | | | | |
|---|---|---|---|---|
| 8,471,811 B2 * | 6/2013 | Harley | ................ | G06F 3/03543 345/157 |
| 10,191,569 B2 * | 1/2019 | Uno | ....................... | G06F 3/0416 |
| 10,705,629 B1 * | 7/2020 | Arnold | .................... | G06F 3/044 |

FOREIGN PATENT DOCUMENTS

| | | |
|---|---|---|
| JP | 2010-257077 A | 11/2010 |
| JP | 2012-35782 A | 2/2012 |
| JP | 2013-178678 A | 9/2013 |
| JP | 5705767 B2 | 4/2015 |

* cited by examiner

*Primary Examiner* — Rodney Amadiz
(74) *Attorney, Agent, or Firm* — Birch, Stewart, Kolasch & Birch, LLP

(57) ABSTRACT

An operation input device includes a knob for operations, disposed in a display region of a touch display; a plurality of conductor columns provided in the knob; a touch point detecting unit that detects a touch point corresponding to at least one of the plurality of conductor columns; a location determining unit that determines a location of at least one of the plurality of conductor columns, using a result of the detection by the touch point detecting unit; and a location estimating unit that estimates, when there is a conductor column that has not been detected as a touch point by the touch point detecting unit, a location of the conductor column that has not been detected as a touch point by the touch point detecting unit, using positional relationship information indicating a positional relationship between the plurality of conductor columns in the knob and location history information indicating a history of locations of the respective plurality of conductor columns.

15 Claims, 12 Drawing Sheets

Electrode Pattern Number

FIG. 13
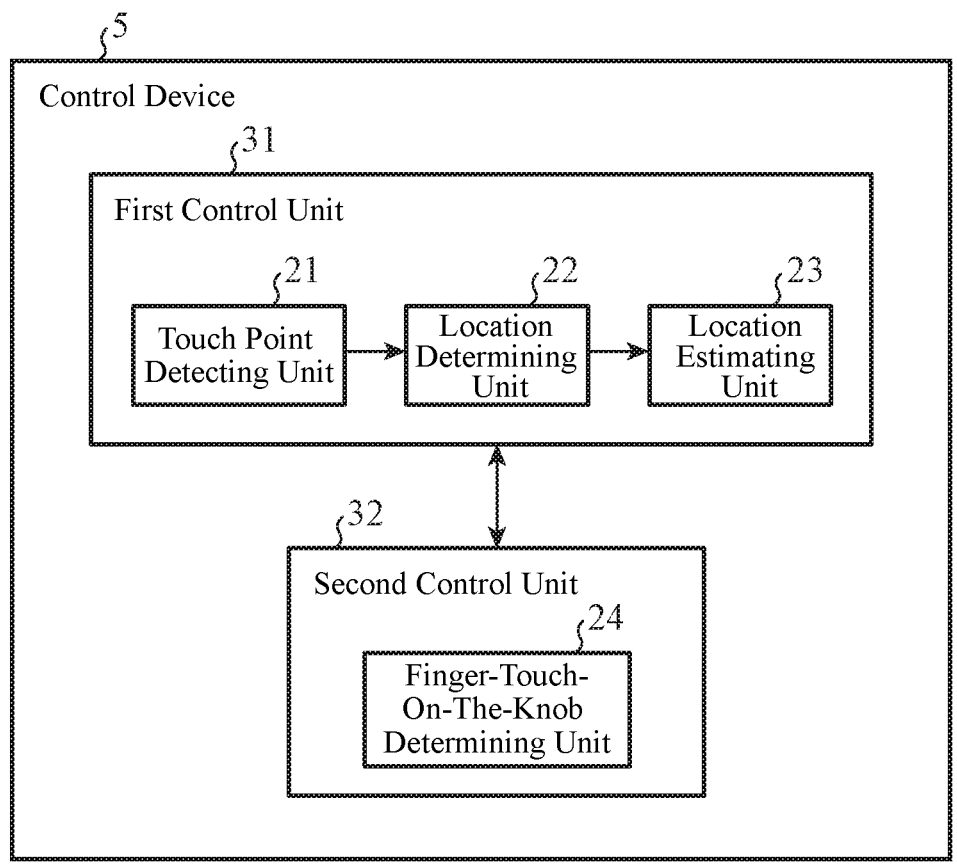
FIG. 14A    FIG. 14B    FIG. 14C
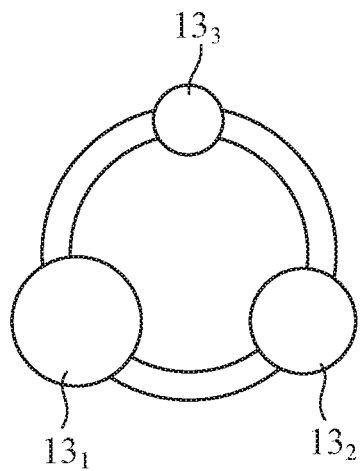 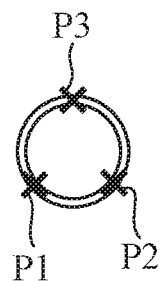 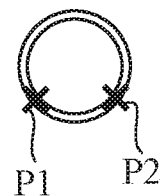

OPERATION INPUT DEVICE

CROSS REFERENCE TO RELATED APPLICATIONS

This application is a Continuation of PCT International Application No. PCT/JP2017/036778 filed on Oct. 11, 2017, which is hereby expressly incorporated by reference into the present application.

TECHNICAL FIELD

The present invention relates to an operation input device.

BACKGROUND ART

Conventionally, a so-called "knob-on-touch-display" is used as an operation input device for an electronic device such as an in-vehicle information device. The knob-on-touch-display includes a dial-like member (hereinafter, referred to as "knob") disposed in a region of a display surface of a touch display in which images can be displayed (hereinafter, referred to as "display region"). The knob is provided so as to be rotatable with respect to the display surface of the touch display or provided so as to be slidable over the display surface of the touch display. By a user touching the display surface of the touch display with his/her fingers or rotating or sliding the knob with an image for operations being displayed on the touch display, requests for performing various types of control assigned to these operations (hereinafter, referred to as "events") are inputted to the electronic device. Patent Literature 1 discloses a knob-on-touch-display that uses a capacitive type touch display.

CITATION LIST

Patent Literatures

Patent Literature 1: JP2013-178678 A

SUMMARY OF INVENTION

Technical Problem

In general, a capacitive type touch display detects a point being touched with a user's finger, by comparing a capacitance value detected by a touch sensor with a threshold value. Namely, in a state in which a user's finger is touching a display surface of the touch display, the human body functions as an electrical ground (hereinafter, referred to as "GND"), and thus, the capacitance value of a point being touched with the user's finger is larger than that of other points. Hence, by setting a threshold value corresponding to a value between the capacitance value of the point being touched with the user's finger and the capacitance value of other points, the point being touched with the user's finger can be detected.

A knob on the knob-on-touch-display of Patent Literature 1 includes a plurality of substantially columnar conductors (hereinafter, referred to as "conductor columns"). In a state in which the knob is being touched with user's fingers, the potentials of the conductor columns have a value equal to the potential of the GND, and points at which the conductor columns are disposed can be detected by the same principle as a principle for detecting a point being touched with a user's finger. Points to be detected on the knob-on-touch-display, i.e., points corresponding to user's fingers, points corresponding to the conductor columns in the knob, and the like, are hereinafter collectively referred to as "touch points".

In addition, the capacitance values of touch points corresponding to the individual conductor columns can be increased by increasing the bottom areas of the individual conductor columns or increasing the number of conductor columns which are electrically continuous with each other. By this, even in a state in which the knob is not being touched with user's fingers, touch points corresponding to the conductor columns can be detected by the above-described principle.

However, during the operation of the knob-on-touch display, some of the plurality of conductor columns may become temporarily undetected as touch points or two or more conductor columns which are some of the plurality of conductor columns may be collectively detected as a single touch point due to various factors. In this case, locations of some of the plurality of conductor columns cannot be accurately determined, and thus, the accuracy of detection of a knob location decrease. As a result, there is a problem that the position of an image displayed on the touch display is prone to be displaced relative to the position of the knob.

The present invention is made to solve a problem such as those described above, and an object of the present invention is to provide a knob-on-touch-display capable of suppressing a reduction in the accuracy of detection of a knob location even when locations of some of a plurality of conductor columns cannot be accurately determined.

Solution to Problem

An operation input device of the present invention includes a knob for operations, disposed in a display region of a touch display; a plurality of conductor columns provided in the knob; a touch point detecting unit for detecting a touch point corresponding to at least one of the plurality of conductor columns; a location determining unit for determining a location of the at least one of the plurality of conductor columns, using a result of the detection by the touch point detecting unit; and a location estimating unit for estimating, when there is a conductor column that has not been detected as a touch point by the touch point detecting unit, a location of the conductor column that has not been detected as a touch point by the touch point detecting unit, using positional relationship information indicating a positional relationship between the plurality of conductor columns in the knob and location history information indicating a history of locations of the respective plurality of conductor columns.

Alternatively, an operation input device of the present invention includes a knob for operations, disposed in a display region of a touch display; a plurality of conductor columns provided in the knob and including a first conductor column that can be detected as a touch point regardless of whether or not the knob is in a state of being touched with user's fingers; and a second conductor column that can be detected as a touch point only in a state in which the knob is being touched with the user's fingers; a touch point detecting unit for detecting a touch point corresponding to the first conductor column in a state in which the knob is not being touched with the user's fingers; a location determining unit for determining a location of the first conductor column, using a result of the detection by the touch point detecting unit in the state in which the knob is not being touched with the user's fingers; and a location estimating unit for estimating a location of the second conductor column, using positional relationship information indicating a positional relationship between the plurality of conductor columns in the knob and location history information indicating a history of locations of the respective plurality of conductor columns, in the state in which the knob is not being touched with the user's fingers.

Alternatively, an operation input device of the present invention includes a knob for operations, disposed in a display region of a touch display; a plurality of conductor columns provided in the knob; a touch point detecting unit for detecting touch points corresponding to the plurality of conductor columns in a first operating mode in a state in which the knob is being touched with user's fingers, and detecting touch points corresponding to the plurality of conductor columns in a second operating mode in a state in which the knob is not being touched with the user's fingers, the second operating mode being higher in detection sensitivity than the first operating mode; a location determining unit for determining locations of the respective plurality of conductor columns, using results of the detection obtained in the first operating mode, in the state in which the knob is being touched with the user's fingers; and a location estimating unit for estimating locations of the respective plurality of conductor columns, using results of the detection obtained in the second operating mode, in the state in which the knob is not being touched with the user's fingers.

Advantageous Effects of Invention

According to the present invention, by including the location estimating unit, even when locations of some of the plurality of conductor columns cannot be accurately determined, a reduction in the accuracy of detection of a knob location can be suppressed.

BRIEF DESCRIPTION OF DRAWINGS

FIG. 13 is a block diagram showing the main part of a control device according to the third embodiment of the present invention.

FIG. 14A is an explanatory diagram showing disposition of three conductor columns in a knob according to the third embodiment of the present invention, FIG. 14B is an explanatory diagram showing a situation in which first conductor columns and a second conductor column are detected as touch points in a state in which the knob is being touched with user's fingers, and FIG. 14C is an explanatory diagram showing a situation in which the first conductor columns are detected as touch points in a state in which the knob is not being touched with user's fingers.

DESCRIPTION OF EMBODIMENTS

To describe the invention in more details, modes for carrying out the invention will be described below with reference to the accompanying drawings.

First Embodiment

Figure 1:
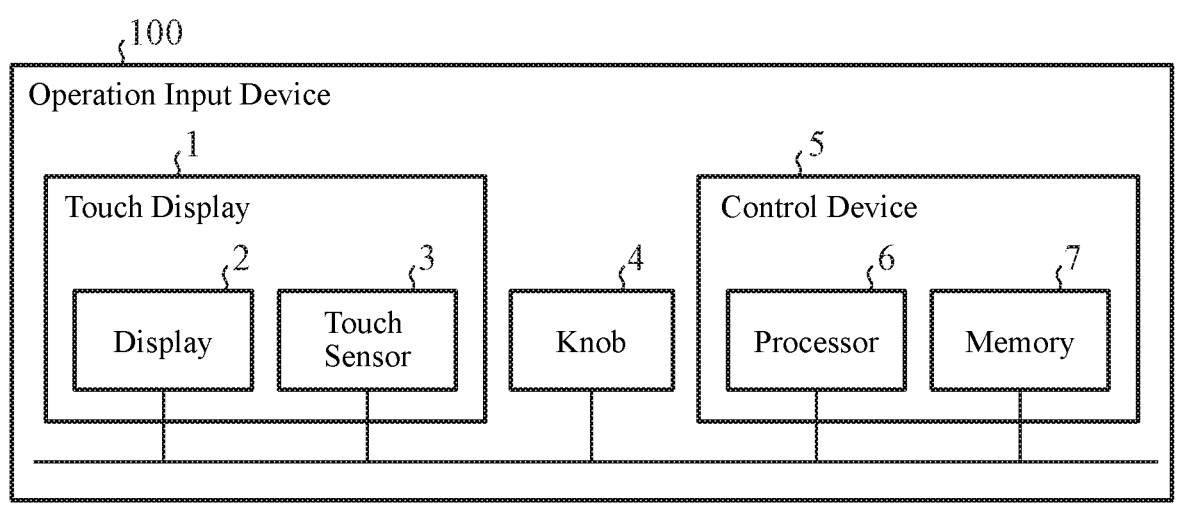
FIG. 1 is a block diagram showing a hardware configuration of an operation input device according to a first embodiment of the present invention.
Figure 2C:
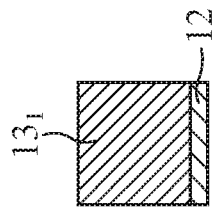
FIG. 2C is a cross-sectional view showing a state of one conductor column and a part of a bottom plate in the knob according to the first embodiment of the present invention, viewed from the side.
Figure 2B:
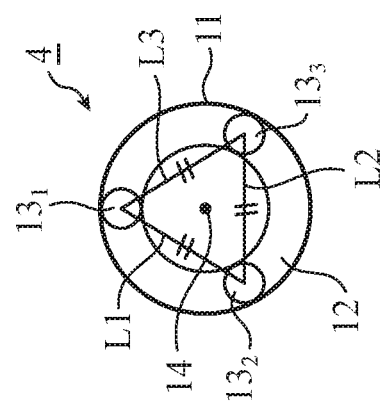
FIG. 2B is a plan view showing the main part of the knob according to the first embodiment of the present invention.
Figure 2A:
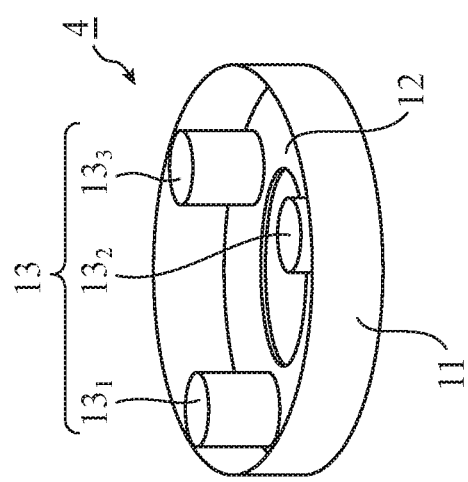
FIG. 2A is a perspective view showing the main part of a knob according to the first embodiment of the present invention.
Figure 3:
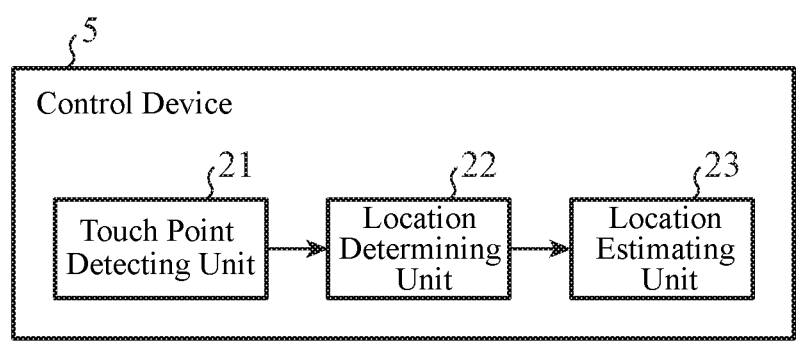
FIG. 3 is a block diagram showing the main part of a control device according to the first embodiment of the present invention.

FIG. 1 is a block diagram showing a hardware configuration of an operation input device according to a first embodiment. FIG. 2A is a perspective view showing the main part of a knob according to the first embodiment. FIG. 2B is a plan view showing the main part of the knob according to the first embodiment. FIG. 2C is a cross-sectional view showing a state of one conductor column and a part of a bottom plate in the knob according to the first embodiment, viewed from the side. FIG. 3 is a block diagram showing the main part of a control device according to the first embodiment. With reference to FIGS. 1 to 3, an operation input device 100 of the first embodiment will be described.

As shown in FIG. 1, the operation input device 100 includes a touch display 1. The touch display 1 includes a display 2 and a touch sensor 3. The display 2 is composed of, for example, a liquid crystal display or an organic electro luminescence (EL) display. The touch sensor 3 includes, for example, a plurality of electrode patterns arranged over a display surface of the display 2. Namely, the touch display 1 is of a capacitive type. Note that the touch sensor 3 may be a self-capacitance type sensor or may be a mutual capacitance type sensor.

As shown in FIG. 1, the operation input device 100 includes a knob 4. The knob 4 is disposed at an arbitrary location in a display region of the touch display 1. The knob 4 is rotatably placed or mounted on a display surface of the touch display 1 or is slidably placed or mounted on the display surface of the touch display 1. Note that the knob 4 may be detachable from the touch display 1, or the location of the knob 4 in the display region may be changeable by detachment.

The knob 4 has a conductive part that user's fingers can touch when a user grasps the knob 4 (hereinafter, referred to as "conductive portion for grasping"). In an example shown in FIG. 2, the conductive portion for grasping includes a substantially cylindrical outer conductive portion 11. The outer conductive portion 11 is made of a conductor or made of resin coated with a conductive material. A substantially disc-shaped bottom plate 12 made of resin is provided at one of two opening portions of the outer conductive portion 11.

The knob 4 includes a plurality of conductor columns 13 which are provided perpendicularly to the bottom plate 12 and contained in the outer conductive portion 11. In the example shown in FIG. 2, three conductor columns $13_1$ to $13_3$ are disposed at locations corresponding to the respective vertices of an equilateral triangle, and straight-line distances L1, L2, and L3 between two conductor columns among the conductor columns $13_1$ to $13_3$ are equal to each other (L1≈L2≈L3). The conductor columns $13_1$ to $13_3$ each are electrically continuous with the outer conductive portion 11 and have such a large bottom area that the conductor column is detected as a touch point regardless of whether or not the conductive portion for grasping is in a state of being touched with user's fingers. A bottom portion of each of the conductor columns $13_1$ to $13_3$ is disposed facing the display surface of the touch display 1 with the bottom plate 12 therebetween.

Note that the conductive portion for grasping may include a substantially disc-shaped conductive cover body (not shown) provided at the other one of the two opening portions of the outer conductive portion 11. Namely, the knob 4 has a substantially ring-like outside shape, and a substantially columnar hollow portion 14 is provided in the knob 4 so as to go along an axial core of the knob 4.

As shown in FIG. 1, the operation input device 100 includes a control device 5. The control device 5 includes a processor 6 and a memory 7. The memory 7 stores a program for implementing functions of a touch point detecting unit 21, a location determining unit 22, and a location estimating unit 23 which are shown in FIG. 3. By the processor 6 reading and executing the program stored in the memory 7, the functions of the touch point detecting unit 21, the location determining unit 22, and the location estimating unit 23 are implemented.

The processor 6 uses, for example, a central processing unit (CPU), a graphics processing unit (GPU), a microprocessor, a microcontroller, or a digital signal processor (DSP). The memory 7 uses, for example, a semiconductor memory such as a random-access memory (RAM), a read only memory (ROM), a flash memory, an erasable programmable read only memory (EPROM), or an electrically erasable programmable read-only memory (EEPROM), a magnetic disk, an optical disc, or a magneto-optical disc.

Here, in the memory 7 there is stored in advance information indicating a positional relationship between the plurality of conductor columns 13 in the knob 4 (hereinafter, referred to as "positional relationship information"). The positional relationship information includes, for example, information indicating a disposition form defined by the plurality of conductor columns 13 (in the example shown in FIG. 2, an equilateral triangle) and information indicating straight-line distances (in the example shown in FIG. 2, L1, L2, and L3) between two conductor columns among the plurality of conductor columns 13.

In addition, the memory 7 stores information indicating a history of locations of the respective plurality of conductor columns 13 in the display region of the touch display 1 (hereinafter, referred to as "location history information"). Each location indicated by the location history information is determined in the past by the location determining unit 22 or is estimated in the past by the location estimating unit 23. Namely, the location determining unit 22 has a function of storing information indicating each location determined by the location determining unit 22 in the memory 7 whenever necessary. In addition, the location estimating unit 23 has a function of storing information indicating each location estimated by the location estimating unit 23 in the memory 7 whenever necessary.

With reference to FIG. 3, the main part of the control device 5 will be described below.

The touch point detecting unit 21 detects touch points using signals outputted from the touch sensor 3. Specifically, for example, the touch point detecting unit 21 detects touch points by performing a threshold value determining process that uses capacitance values indicated by signals outputted from the touch sensor 3. The touch point detecting unit 21 outputs information about the detected touch points (hereinafter, referred to as "touch point information").

Namely, the touch point information indicates results of the detection by the touch point detecting unit 21. The touch point information includes, for example, information indicating the capacitance value of each touch point, information indicating the coordinate values of each touch point, information indicating the area of each touch point, and information indicating a load on each touch point.

Normally, the results of the detection by the touch point detecting unit 21 include a touch point corresponding to at least one of the conductor columns 13. A conductor column detected as a touch point by the touch point detecting unit 21 among the plurality of conductor columns 13 may be hereinafter referred to as "detected conductor column". The location determining unit 22 determines a touch point corresponding to a detected conductor column among the touch points detected by the touch point detecting unit 21, using the touch point information outputted from the touch point detecting unit 21. By this, the location determining unit 22 determines a location of the detected conductor column in the display region of the touch display 1.

The location estimating unit 23 determines, using results of the determination by the location determining unit 22, whether there is a conductor column that has not been detected as a touch point by the touch point detecting unit 21 (which may be hereinafter referred to as "non-detected conductor column") among the plurality of conductor columns 13. When there is a non-detected conductor column, the location estimating unit 23 estimates a location of the non-detected conductor column in the display region of the touch display 1, using the positional relationship information and location history information stored in the memory 7.

Note that factors for occurrence of a non-detected conductor column, specific examples of an estimation process performed by the location estimating unit 23, and the like, will be described later with reference to FIGS. 5 to 7.

The touch point detecting unit 21, the location determining unit 22, and the location estimating unit 23 form the main part of the control device 5.

Figure 4:
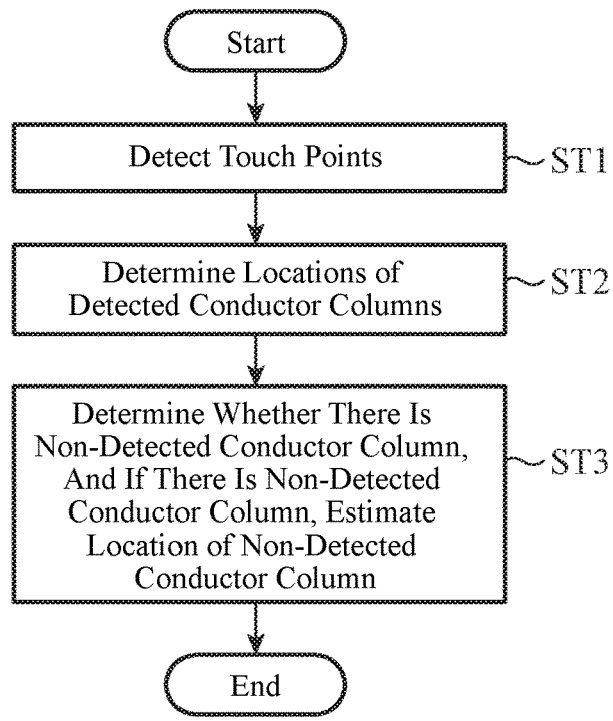
FIG. 4 is a flowchart showing the operation of the control device according to the first embodiment of the present invention.

Next, with reference to a flowchart of FIG. 4, the operation of the control device 5 will be described. The control device 5 repeatedly performs the following processes at step ST1 to ST3 at predetermined time intervals.

First, at step ST1, the touch point detecting unit 21 detects touch points using signals outputted from the touch sensor 3. The touch point detecting unit 21 outputs touch point information about the detected touch points.

Then, at step ST2, the location determining unit 22 determines touch points corresponding to detected conductor columns among the touch points detected by the touch point detecting unit 21, using the touch point information outputted from the touch point detecting unit 21. By this, the location determining unit 22 determines locations of the detected conductor columns in the display region of the touch display 1. The location determining unit 22 stores information indicating the determined locations in the memory 7.

Then, at step ST3, the location estimating unit 23 determines whether there is a non-detected conductor column, using results of the determination by the location determining unit 22. If there is a non-detected conductor column, the location estimating unit 23 estimates a location of the non-detected conductor column in the display region of the touch display 1, using the positional relationship information and location history information stored in the memory 7. The location estimating unit 23 stores information indicating the estimated location in the memory 7.

Next, with reference to FIGS. 5 to 7, factors for occurrence of a non-detected conductor column, specific examples of an estimation process performed by the location estimating unit 23, and the like, will be described.

When a user is operating the knob 4, by the user quickly sliding the knob 4, the knob 4 may be inclined relative to the display surface of the touch display 1. Depending on the inclination, the distances between some of the plurality of conductor columns 13 and the touch sensor 3 increase, and some conductor columns become temporarily undetected as touch points.

Figure 5:
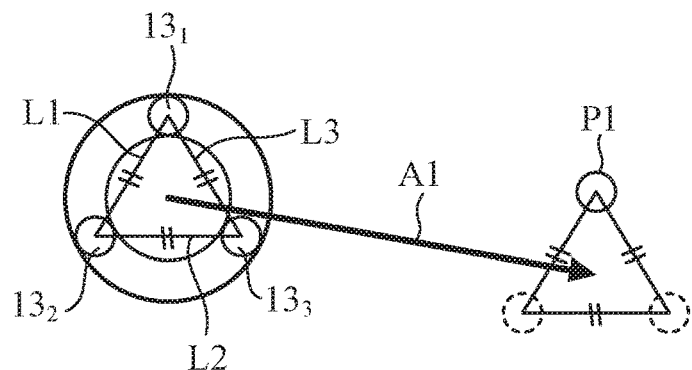
FIG. 5 is an explanatory diagram showing a situation in which when the knob is slid, two conductor columns among three conductor columns become temporarily undetected as touch points.

For example, in an example shown in FIG. 5, before starting sliding of the knob 4, the three conductor columns $13_1$ to $13_3$ are all detected as touch points, whereas during sliding in a direction along an arrow A1, only one conductor column $13_1$ is detected as a touch point P1, i.e., the remaining two conductor columns $13_2$ and $13_3$ are not detected as touch points. Even in such a case, by using positional relationship information and location history information, locations of the remaining two conductor columns $13_2$ and $13_3$ can be estimated. Namely, by the condition that the disposition form is an equilateral triangle with $L1 \approx L2 \approx L3$, etc., the locations of the conductor columns $13_2$ and $13_3$ can be estimated on the basis of the location of the conductor column $13_1$.

Likewise, when the user is operating the knob 4, by the user quickly rotating the knob 4, the knob 4 may be inclined relative to the display surface of the touch display 1. Depending on the inclination, the distances between some of the plurality of conductor columns 13 and the touch sensor 3 increase, and some conductor columns become temporarily undetected as touch points.

Figure 6:
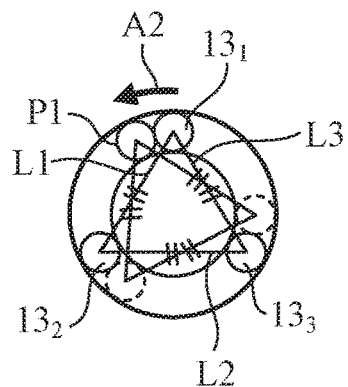
FIG. 6 is an explanatory diagram showing a situation in which when the knob is rotated, two conductor columns among the three conductor columns become temporarily undetected as touch points.

For example, in an example shown in FIG. 6, before starting rotation of the knob 4, the three conductor columns $13_1$ to $13_3$ are all detected as touch points, whereas during rotation in a direction along an arrow A2, only one conductor column $13_1$ is detected as a touch point P1, i.e., the remaining two conductor columns $13_2$ to $13_3$ are not detected as touch points. Even in such a case, by using positional relationship information and location history information, locations of the remaining two conductor columns $13_2$ to $13_3$ can be estimated. Namely, by the condition that the disposition form is an equilateral triangle with $L1 \approx L2 \approx L3$, etc., the locations of the conductor columns $13_2$ to $13_3$ can be estimated on the basis of the location of the conductor column $13_1$.

In addition, even when the user is not operating the knob 4, due to bending of the bottom plate 12, the distances between some of the plurality of conductor columns 13 and the touch sensor 3 may increase. In this case, too, some conductor columns become undetected as touch points.

Figure 7:
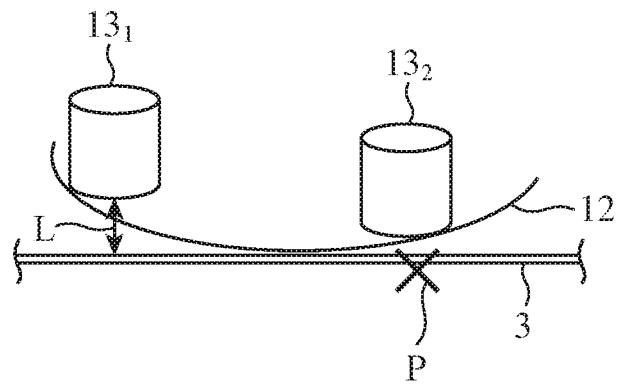
FIG. 7 is an explanatory diagram showing a situation in which one conductor column among the three conductor columns becomes undetected as a touch point due to bending of the bottom plate of the knob.

For example, in an example shown in FIG. 7, due to bending of the bottom plate 12, a distance L between one conductor column $13_1$ among the three conductor columns $13_1$ to $13_3$ and the touch sensor 3 increases. In this case, since the remaining two conductor columns $13_2$ to $13_3$ are detected as touch points by the touch point detecting unit 21 (P in the drawing), locations of the conductor columns $13_2$ to $13_3$ can be determined by the location determining unit 22. On the other hand, the conductor column $13_1$ is not detected as a touch point by the touch point detecting unit 21, but by using positional relationship information and location history information, the location of the conductor column $13_1$ can be estimated on the basis of the locations of the conductor columns $13_2$ to $13_3$.

Note that the disposition of the conductor columns $13_1$ to $13_3$ is not limited to locations corresponding to the respective vertices of an equilateral triangle and may be locations corresponding to the respective vertices of, for example, a right triangle or an isosceles triangle. Note also that the number of the conductor columns 13 included in the knob 4 is not limited to three, and for example, four conductor columns 13 may be disposed at locations corresponding to the respective vertices of a quadrangle. The contents of positional relationship information are not limited to the above-described specific example and may be any as long as the contents are related to the number and disposition of the conductor columns 13 in the knob 4.

As described above, the operation input device 100 of the first embodiment includes the knob 4 for operations disposed in the display region of the touch display 1; the plurality of conductor columns 13 provided in the knob 4; the touch point detecting unit 21 that detects a touch point corresponding to at least one of the plurality of conductor columns 13; the location determining unit 22 that determines a location of at least one of the plurality of conductor columns 13, using a result of the detection by the touch point detecting unit 21; and the location estimating unit 23 that estimates, when there is a conductor column that has not been detected as a touch point by the touch point detecting unit 21, a location of the conductor column that has not been detected as a touch point by the touch point detecting unit 21, using positional relationship information indicating a positional relationship between the plurality of conductor columns 13 in the knob 4 and location history information indicating a history of locations of the respective plurality of conductor columns 13. By including the location estimating unit 23, even when some conductor columns (non-detected conductor columns) among the plurality of conductor columns 13 have not been detected as touch points, a reduction in the accuracy of detection of a knob location can be suppressed.

Second Embodiment

Figure 8:
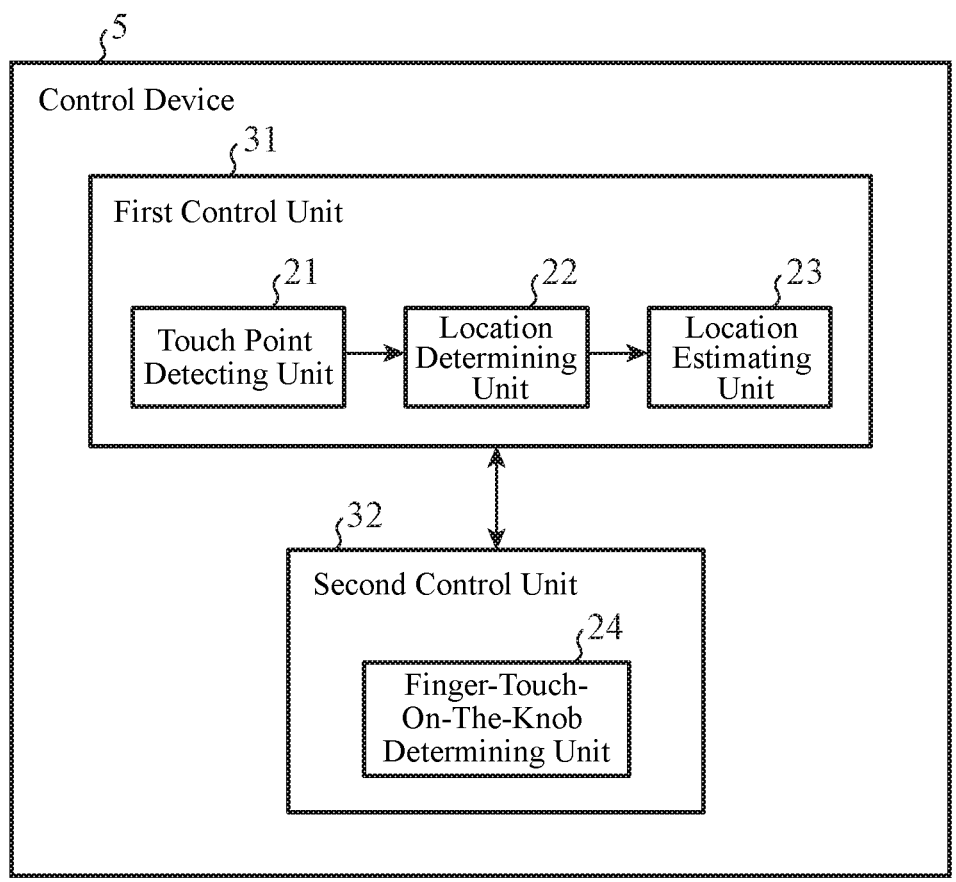
FIG. 8 is a block diagram showing the main part of a control device according to a second embodiment of the present invention.

FIG. 8 is a block diagram showing the main part of a control device according to a second embodiment. With reference to FIG. 8, an operation input device 100 of the second embodiment will be described. Note that a hardware configuration of the operation input device 100 according to the second embodiment is the same as that described with reference to FIG. 1 in the first embodiment, and thus, FIG. 1 is incorporated, and description thereof is omitted. Note also that a structure of a knob 4 according to the second embodiment is the same as that described with reference to FIG. 2 in the first embodiment, and thus, FIG. 2 is incorporated, and description thereof is omitted. Note also that in FIG. 8, the same blocks as those shown in FIG. 3 are denoted by the same reference signs and description thereof is omitted.

A finger-touch-on-the-knob determining unit 24 determines whether the knob 4 is in a state of being touched with user's fingers. The location estimating unit 23 estimates a location of a non-detected conductor column in a state in which the knob 4 is not being touched with user's fingers.

The touch point detecting unit 21, the location determining unit 22, and the location estimating unit 23 form a first control unit 31. The finger-touch-on-the-knob determining unit 24 forms a second control unit 32. The first control unit 31 and the second control unit 32 form the main part of the control device 5.

With reference to FIGS. 9 to 11 specific examples of a method for determination by the finger-touch-on-the-knob determining unit 24 will be described below.

(First Specific Example)

In a first specific example, it is determined whether the knob 4 is in a state of being touched with user's fingers, by performing a threshold value determining process that uses the capacitance values of touch points corresponding to the conductor columns 13.

In an example shown in FIG. 9, the touch sensor 3 is of a mutual capacitance type. Namely, a plurality of electrode patterns for driving and a plurality of electrode patterns for reception are arranged over the display surface of the display 2. The electrode patterns for driving and the electrode patterns for reception are provided in a substantially orthogonal orientation relative to each other and intersect with each other. A signal for detection is applied to each of the electrode patterns for driving at predetermined timing. In the drawing, 41 indicates one of the electrode patterns for driving, 42 indicates one of the electrode patterns for reception, and 43 indicates a conductive portion for grasping of the knob 4.

Figure 9A:
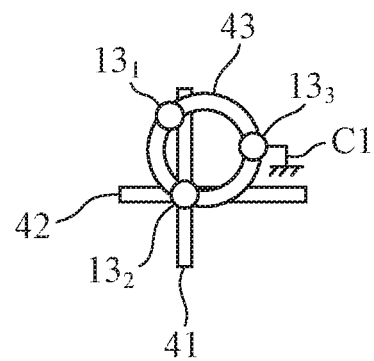
FIG. 9A is an explanatory diagram showing a state in which a knob is not being touched with a user's finger.

FIG. 9A shows a state in which the knob 4 is not being touched with a user's finger. In an example shown in FIG. 9A, of the three conductor columns $13_1$ to $13_3$ provided in the knob 4, two conductor columns $13_1$ to $13_2$ are disposed on the electrode pattern for driving 41 to which a signal for detection is being applied. In addition, the remaining one conductor column $13_3$ is disposed on another electrode pattern for driving (not shown) to which a signal for detection is not being applied. Furthermore, a distance between the conductive portion for grasping 43 and the electrode patterns for driving is set to a sufficiently small value. Hence, parasitic capacitance C1 occurs.

Figure 9B:
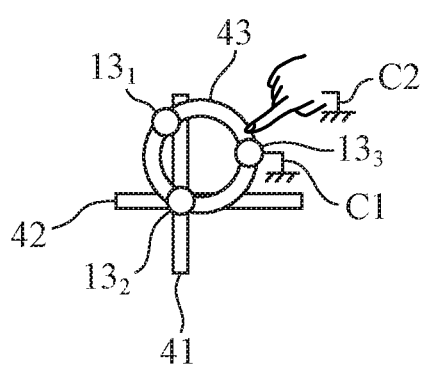
FIG. 9B is an explanatory diagram showing a state in which the knob is being touched with a user's finger.

On the other hand, FIG. 9B shows a state in which the knob 4 is being touched with a user's finger. In this state, in addition to the same parasitic capacitance C1 as that shown in FIG. 9A, parasitic capacitance C2 resulting from the human body functioning as a GND occurs.

Namely, in the state in which the knob 4 is being touched with the user's finger, larger parasitic capacitance (C1+C2) than the parasitic capacitance (C1) occurring in the state in which the knob 4 is not being touched with the user's finger occurs. Hence, touch point information includes the capacitance values of touch points corresponding to the conductor columns 13, and the capacitance values vary between the state in which the knob 4 is not being touched with a user's finger (FIG. 9A) and the state in which the knob 4 is being touched with a user's finger (FIG. 9B). Therefore, by performing a threshold value determining process using the capacitance values, it can be determined whether the knob 4 is in a state of being touched with a user's finger.

Here, when a plurality of touch points corresponding to the conductor columns 13 is detected, it is preferable to compare a total value or an average value of the capacitance values of any two or more of the touch points with a threshold value. By this, the robustness of a positional relationship between the electrode patterns and the conductor columns $13_1$ to $13_3$ can be improved.

Figure 10A:
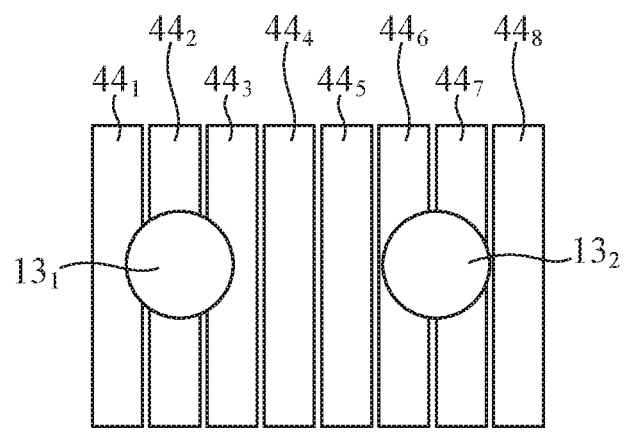
FIG. 10A is an explanatory diagram showing a state in which conductor columns are disposed on electrode patterns of a touch sensor.
Figure 10B:
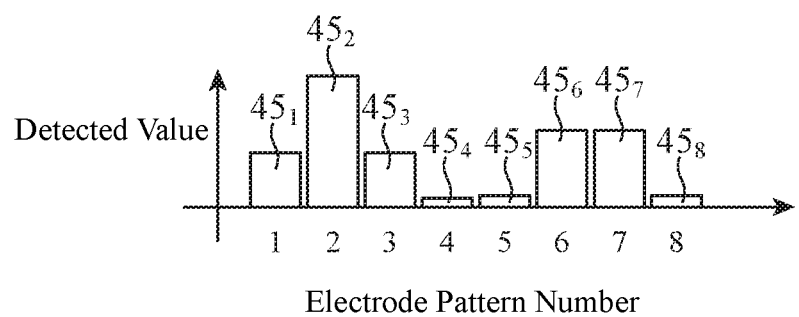
FIG. 10B is a characteristic diagram showing an example of capacitance values detected by each electrode pattern in the state shown in FIG. 10A.

Namely, in an example shown in FIG. 10, the touch sensor 3 is of a self-capacitance type. $44_1$ to $44_8$ in FIG. 10A indicate eight electrode patterns among a plurality of electrode patterns included in the touch sensor 3, and $45_1$ to $45_8$ in FIG. 10B indicate capacitance values detected by the electrode patterns $44_1$ to $44_8$ (which may be hereinafter referred to as "detected values").

In an example shown in FIG. 10A, while the conductor column $13_1$ is disposed across three electrode patterns $44_1$ to $44_3$, the conductor column $13_2$ is disposed across two electrode patterns $44_6$ and $44_7$. In this case, as shown in FIG.

10B, capacitance values detected by the electrode patterns $44_1$ to $44_3$ (i.e., the capacitance value of a touch point corresponding to the conductor column $13_1$) and capacitance values detected by the electrode patterns $44_6$ and $44_7$ (i.e., the capacitance value of a touch point corresponding to the conductor column $13_2$) differ from each other.

Namely, the capacitance values of touch points corresponding to the respective conductor columns $13_1$ to $13_3$ can vary depending on a positional relationship of the conductor columns $13_1$ to $13_3$ relative to the electrode patterns $44_1$ to $44_8$. Hence, if the capacitance value of a single touch point is compared with the threshold value, then the capacitance value varies depending on the disposition location of a conductor column 13 corresponding to the single touch point, and thus, there is a possibility of a reduction in the accuracy of a threshold value determining process by the finger-touch-on-the-knob determining unit 24. On the other hand, by comparing a total value or an average value of the capacitance values of two or more touch points with the threshold value, such a reduction in the accuracy of a threshold value determining process can be suppressed. The same can also be said for a case of using the touch sensor 3 of a mutual capacitance type.

(Second Specific Example)

In a second specific example, it is determined whether the knob 4 is in a state of being touched with user's fingers, on the basis of a shift in coordinate values occurring when user's fingers touch the knob 4.

Figure 11A:
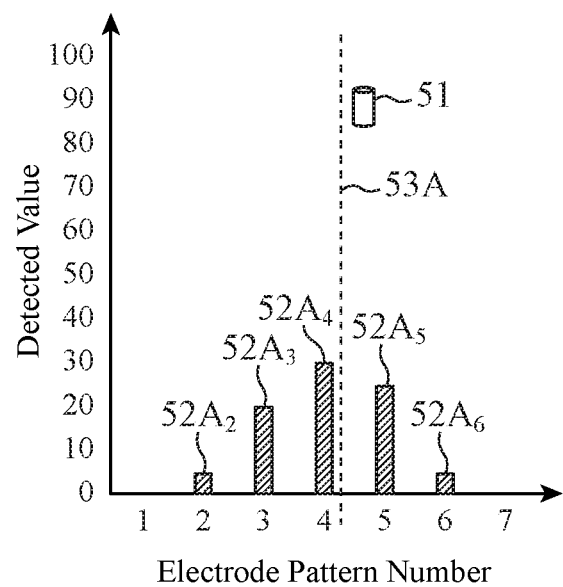
FIG. 11A is a characteristic diagram showing an example of capacitance values detected by electrode patterns of the touch sensor in a state in which the knob is not being touched with user's fingers.
Figure 11B:
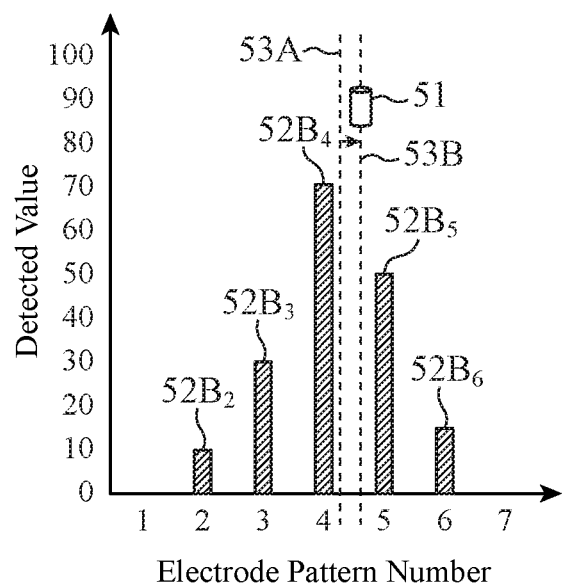
FIG. 11B is a characteristic diagram showing an example of capacitance values detected by the electrode patterns of the touch sensor in a state in which the knob is being touched with user's fingers.

In each of FIGS. 11A and 11B, numerical values marked on a horizontal axis indicate numbers assigned to seven electrode patterns of the touch sensor 3, and 51 indicates the location of the conductor column $13_1$ in an arrangement direction of the seven electrode patterns. 52A2 to 52A6 shown in FIG. 11A indicate capacitance values detected by electrode patterns Nos. 2 to 6 among the seven electrode patterns (which may be hereinafter referred to as "detected values") in a state in which the knob 4 is not being touched with user's fingers. 52B2 to 52B6 shown in FIG. 11B indicate detected values which are detected by the electrode patterns Nos. 2 to 6 among the seven electrode patterns in a state in which the knob 4 is being touched with user's fingers. 53A shown in FIG. 11A indicates the touch coordinate values of a touch point corresponding to the conductor column $13_1$ in the arrangement direction of the electrode patterns in the state in which the knob 4 is not being touched with user's fingers. 53B shown in FIG. 11B indicates the touch coordinate values of a touch point corresponding to the conductor column $13_1$ in the arrangement direction of the electrode patterns in the state in which the knob 4 is being touched with user's fingers.

As shown in FIG. 11, when user's fingers touch the knob 4, the detected values which are detected by the respective electrode patterns Nos. 2 to 6 increase, and the ratio between a detected value which is detected by each individual electrode pattern and detected values which are detected by other electrode patterns changes. By this, the touch coordinate values of the touch point corresponding to the conductor column $13_1$ change in a predetermined direction with respect to the location 51 of the conductor column $13_1$ (53A->53B in the drawing). Likewise, when the user's fingers are released from the knob 4, the touch coordinate values of the touch point corresponding to the conductor column $13_1$ change in an opposite direction with respect to the location 51 of the conductor column $13_1$ (53B->53A in the drawing).

Hence, in the memory 7 is stored in advance a data table in which touch coordinate values that can be taken by touch points corresponding to the conductor columns 13 in a state in which the knob 4 is not being touched with user's fingers are associated with predicted values of the amount of change in the touch coordinate values occurring when user's fingers touch the knob 4. In addition, in the memory 7 is stored in advance a data table in which touch coordinate values that can be taken by touch points corresponding to the conductor columns 13 in a state in which the knob 4 is being touched with user's fingers are associated with predicted values of the amount of change in the touch coordinate values occurring when the user's fingers are released from the knob 4.

Touch point information outputted from the touch point detecting unit 21 includes the coordinate values of a touch point corresponding to a conductor column 13. The finger-touch-on-the-knob determining unit 24 calculates the amount of change over time in the coordinate values and compares the calculated amount of change with a predicted value in the data table and detects that user's fingers have touched the knob 4 and that the user's fingers have been released from the knob 4. The finger-touch-on-the-knob determining unit 24 determines, using a result of the detection, whether the knob 4 is in a state of being touched with the user's fingers.

(Third Specific Example)

In a third specific example, it is determined whether the knob 4 is in a state of being touched with user's fingers, on the basis of whether there is a so-called "coordinate deviation".

Normally, the capacitive type touch display 1 can accurately detect a touch point when the GND potential of the human body matches the GND potential of the touch sensor 3. Here, when the GND potential of the human body and the GND potential of the touch sensor 3 do not match each other due to power supply noise, noise is added to a detected value which is detected by the touch sensor 3, and the detected value fluctuates in a short period of time. As a result, the touch coordinate values of each touch point indicated by touch point information also fluctuate in a short period of time, and a so-called coordinate deviation occurs.

By the same principle as this principle, in a state in which the knob 4 is being touched with user's fingers, due to power supply noise, the capacitance value of a touch point corresponding to a conductor column 13 fluctuates in a short period of time. As a result, a coordinate deviation occurs also in the touch point corresponding to the conductor column 13.

Hence, the finger-touch-on-the-knob determining unit 24 determines whether there is a coordinate deviation, by performing the following threshold value determining process. Namely, the finger-touch-on-the-knob determining unit 24 calculates the amount of change over predetermined time for the coordinate values of a touch point corresponding to a conductor column 13. The finger-touch-on-the-knob determining unit 24 compares the value of the calculated amount of change with a predetermined threshold value. In addition, the finger-touch-on-the-knob determining unit 24 determines, using the calculated amount of change, whether the knob 4 is rotated or slid. When the calculated amount of change has a value greater than or equal to the threshold value and the knob 4 is neither rotated nor slid, the finger-touch-on-the-knob determining unit 24 determines that a coordinate deviation has occurred. Otherwise, the finger-touch-on-the-knob determining unit 24 determines that a coordinate deviation has not occurred.

When the finger-touch-on-the-knob determining unit 24 determines that a coordinate deviation has occurred or when the finger-touch-on-the-knob determining unit 24 determines that the knob 4 is rotated or slid, the finger-touch-on-the-knob determining unit 24 determines that the knob 4 is in a state of being touched with user's fingers. On the other hand, when the finger-touch-on-the-knob determining unit 24 determines that the knob 4 is neither rotated nor slid and a coordinate deviation has not occurred, the finger-touch-on-the-knob determining unit 24 determines that the knob 4 is in a state of not being touched with user's fingers.

Note that the operation input device 100 of the second embodiment can adopt various variants which are the same as those described in the first embodiment. For example, the disposition of the conductor columns $13_1$ to $13_3$ is not limited to locations corresponding to the respective vertices of an equilateral triangle, and the number of the conductor columns 13 is not limited to three.

As described above, in the operation input device 100 of the second embodiment, the location estimating unit 23 estimates a location of a conductor column that has not been detected as a touch point by the touch point detecting unit 21 in a state in which of the knob 4 is not being touched with user's fingers. By this, even when some conductor columns (non-detected conductor columns) among the plurality of conductor columns 13 have not been detected as touch points in a state in which the knob 4 is not being touched with user's fingers, a reduction in the accuracy of detection of a knob location can be suppressed.

Third Embodiment

Figure 12A:
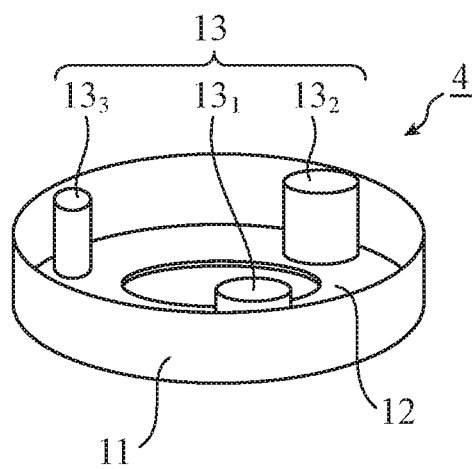
FIG. 12A is a perspective view showing the main part of a knob according to a third embodiment of the present invention.
Figure 12B:
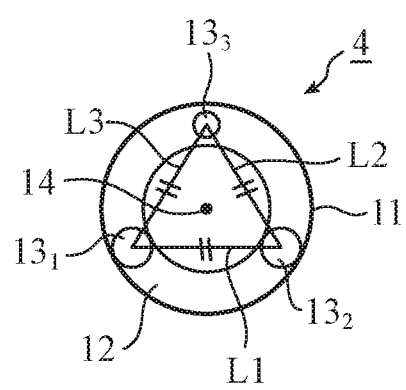
FIG. 12B is a plan view showing the main part of the knob according to the third embodiment of the present invention.

FIG. 12A is a perspective view showing the main part of a knob according to a third embodiment. FIG. 12B is a plan view showing the main part of the knob according to the third embodiment. FIG. 13 is a block diagram showing the main part of a control device according to the third embodiment. With reference to FIGS. 12 and 13, an operation input device 100 of the third embodiment will be described.

Note that a hardware configuration of the operation input device 100 according to the third embodiment is the same as that described with reference to FIG. 1 in the first embodiment, and thus, FIG. 1 is incorporated, and description thereof is omitted. Note also that in FIG. 12, the same components, etc., as those shown in FIG. 2 are denoted by the same reference signs and description thereof is omitted. Note also that in FIG. 13, the same blocks as those shown in FIG. 8 are denoted by the same reference signs and description thereof is omitted.

As shown in FIG. 12, each of two conductor columns $13_1$ to $13_2$ among three conductor columns $13_1$ to $13_3$ has such a large bottom area that the conductor column is detected as a touch point regardless of whether or not the conductive portion for grasping is in a state of being touched with user's fingers. On the other hand, the bottom area of the remaining one conductor column $13_3$ is smaller than that of each of the conductor columns $13_1$ to $13_2$, and the conductor column $13_3$ is detected as a touch point only in a state in which the conductive portion for grasping is being touched with user's fingers.

By this, results of detection by the touch point detecting unit 21 include touch points P1 to P3 corresponding to the respective three conductor columns $13_1$ to $13_3$ in a state in which the knob 4 is being touched with user's fingers (see FIG. 14B), and include the touch points P1 and P2 corresponding to the respective two conductor columns $13_1$ to $13_2$ in a state in which the knob 4 is not being touched with user's fingers (see FIG. 14C).

Of the plurality of conductor columns 13 provided in the knob 4, a conductor column that can be detected as a touch point regardless of whether or not the knob 4 is in a state of being touched with user's fingers may be hereinafter referred to as "first conductor column". In addition, of the plurality of conductor columns 13 provided in the knob 4, a conductor column that can be detected as a touch point only in a state in which the knob 4 is being touched with user's fingers may be referred to as "second conductor column".

The location determining unit 22 determines locations of first conductor columns and a second conductor column in a state in which the knob 4 is being touched with user's fingers, and determines locations of the first conductor columns in a state in which the knob 4 is not being touched with user's fingers, using touch point information outputted from the touch point detecting unit 21. The location estimating unit 23 estimates a location of the second conductor column, using positional relationship information and location history information which are stored in the memory 7, in the state in which the knob 4 is not being touched with user's fingers.

In addition, the finger-touch-on-the-knob determining unit 24 determines whether the knob 4 is in a state of being touched with user's fingers, on the basis of the number of touch points corresponding to conductor columns 13, using the most recent past determination results obtained by the location determining unit 22. For example, when three touch points corresponding to the conductor columns 13 are detected, the finger-touch-on-the-knob determining unit 24 determines that the knob 4 is in a state of being touched with user's fingers, and when two touch points corresponding to conductor columns 13 are detected, the finger-touch-on-the-knob determining unit 24 determines that the knob 4 is in a state of not being touched with user's fingers.

Figure 15:
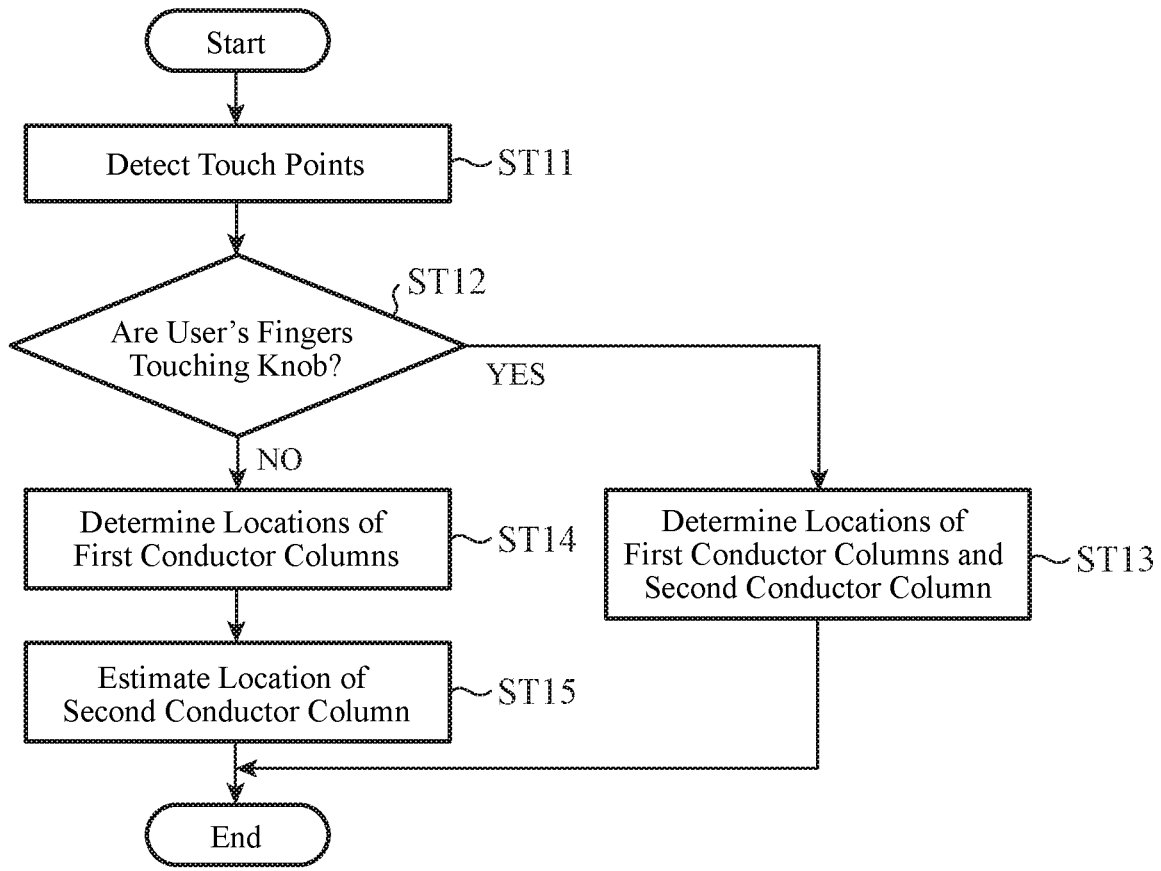
FIG. 15 is a flowchart showing the operation of the control device according to the third embodiment of the present invention.

Next, with reference to a flowchart of FIG. 15, the operation of the control device 5 according to the third embodiment will be described. The control device 5 according to the second embodiment repeatedly performs the following processes at step ST11 to ST15 at predetermined time intervals.

First, at step ST11, the touch point detecting unit 21 detects touch points using signals outputted from the touch sensor 3. The touch point detecting unit 21 outputs touch point information about the detected touch points.

Then, at step ST12, the finger-touch-on-the-knob determining unit 24 determines whether the knob 4 is in a state of being touched with user's fingers, using the most recent past determination results obtained by the location determining unit 22. The finger-touch-on-the-knob determining unit 24 outputs a result of the determination to the location determining unit 22 and the location estimating unit 23.

If the knob 4 is in a state of being touched with user's fingers ("YES" at step ST12), at step ST13, the location determining unit 22 determines locations of first conductor columns and a second conductor column in the display region of the touch display 1, using the touch point information outputted from the touch point detecting unit 21. The location determining unit 22 stores information indicating the determined locations in the memory 7.

On the other hand, if the knob 4 is in a state of not being touched with user's fingers ("NO" at step ST12), at step ST14 the location determining unit 22 determines locations of first conductor columns in the display region of the touch display 1, using the touch point information outputted from the touch point detecting unit 21. The location determining unit 22 stores information indicating the determined locations in the memory 7. Then, at step ST15, the location estimating unit 23 estimates a location of a second conductor column in the display region of the touch display 1, using positional relationship information and location history information which are stored in the memory 7. The location estimating unit 23 stores information indicating the estimated location in the memory 7.

Figure 16A:
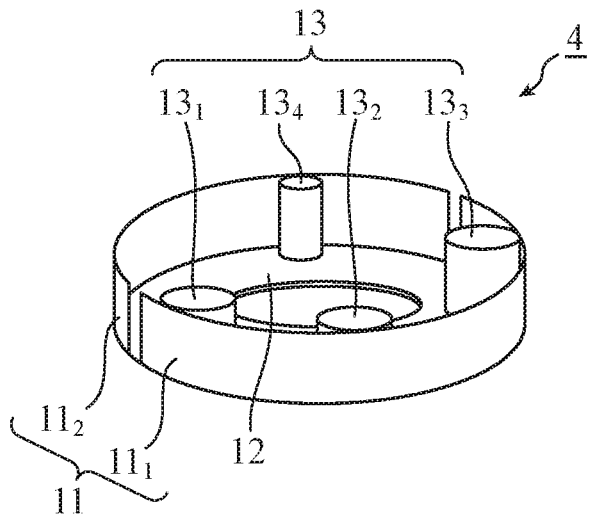
FIG. 16A is a perspective view showing the main part of another knob according to the third embodiment of the present invention.
Figure 16B:
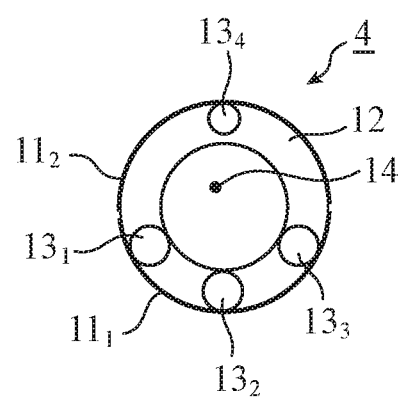
FIG. 16B is a plan view showing the main part of another knob according to the third embodiment of the present invention.
Figure 17A:
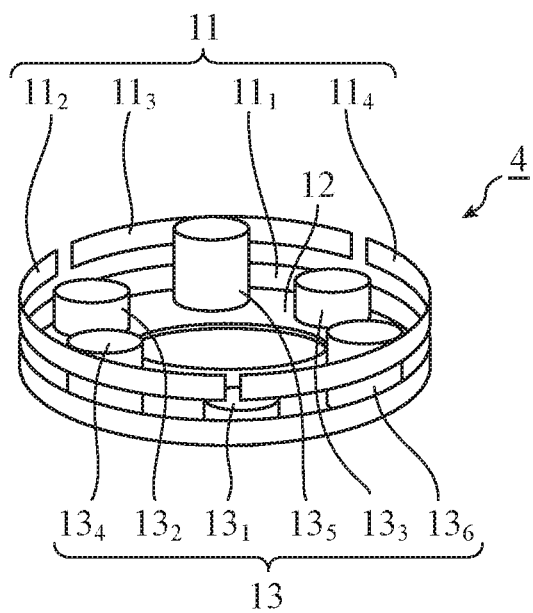
FIG. 17A is a perspective view showing the main part of another knob according to the third embodiment of the present invention.
Figure 17B:
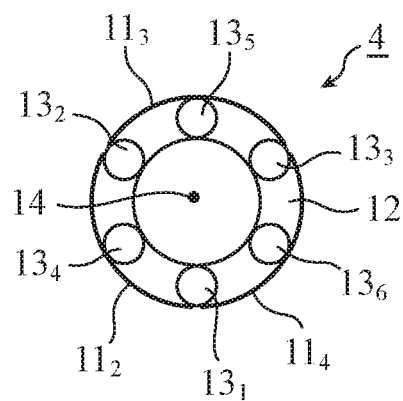
FIG. 17B is a plan view showing the main part of another knob according to the third embodiment of the present invention.

Note that the conductor columns 13 may be any as long as the conductor columns 13 include one or more first conductor columns and one or more second conductor columns, and the structure of the knob 4 is not limited to the example shown in FIG. 12. With reference to FIGS. 16 and 17, variants of the knob 4 according to the third embodiment will be described below.

(First Variant)

In an example shown in FIG. 16, an outer conductive portion 11 is divided into two substantially semi-cylindrical conductive portions $11_1$ and $11_2$. Conductor columns 13 include three conductor columns $13_1$ to $13_3$ which are electrically continuous with one conductive portion $11_1$; and one conductor column $13_4$ which is electrically continuous with the other conductive portion $11_2$.

Here, the conductor columns $13_1$ to $13_3$ each have such a large bottom area that the conductor column is detected as a touch point regardless of whether or not the conductive portion $11_1$ is in a state of being touched with a user's finger, and each are a first conductor column. On the other hand, the bottom area of the second conductor column $13_4$ is smaller than that of each of the first conductor columns $13_1$ to $13_3$, and the second conductor column $13_4$ is not electrically continuous with the first conductor columns $13_1$ to $13_3$. Hence, the second conductor column $13_4$ is detected as a touch point only in a state in which the conductive portion $11_2$ is being touched with a user's finger and is a second conductor column.

Namely, in a state in which the knob 4 is not being grasped by the user, a user's finger is not touching the conductive portion $11_2$, and thus, of the four conductor columns $13_1$ to $13_4$, only three conductor columns $13_1$ to $13_3$ are detected as touch points. On the other hand, in a state in which the knob 4 is being grasped by the user, a user's finger is touching the conductive portion $11_2$, and thus, the four conductor columns $13_1$ to $13_4$ are all detected as touch points.

(Second Variant)

In the knob 4 having the structure shown in FIG. 16, depending on a state of grasping by the user, there is a possibility that a user's finger does not touch the conductive portion $11_2$ and the number of touch points does not increase when the knob 4 is grasped. FIG. 17 shows an example of a knob 4 in which this disadvantage is improved, i.e., a knob 4 in which the number of touch points increases regardless of a state of grasping.

In the example shown in FIG. 17, a substantially cylindrical outer conductive portion 11 includes a conductive portion $11_1$ corresponding to a lower-half portion of the cylinder; and conductive portions $11_2$ to $11_4$ corresponding to respective parts which are formed by dividing an upper-half portion of the cylinder into three substantially equal parts.

Conductor columns 13 include three conductor columns $13_1$ to $13_3$ which are electrically continuous with the conductive portion $11_1$ which is the lower-half portion. The conductor columns $13_1$ to $13_3$ are lower in height than conductor columns $13_4$ to $13_6$ which will be described later and are not electrically continuous with the conductive portions $11_2$ to $11_4$ which are the upper-half portion.

In addition, the conductor columns 13 include three conductor columns $13_4$ to $13_6$ which are electrically continuous with the three conductive portions $11_2$ to $11_4$, respectively. Namely, the conductor column $13_4$ is electrically continuous with the conductive portion $11_2$, the conductor column $13_5$ is electrically continuous with the conductive portion $11_3$, and the conductor column $13_6$ is electrically continuous with the conductive portion $11_4$. The conductor columns $13_4$ to $13_6$ each are not electrically continuous with the conductive portion $11_1$ which is the lower-half portion.

In such a structure, the three first conductor columns $13_1$ to $13_3$ are detected as touch points regardless of whether or not a user's finger is touching the conductive portion $11_1$ and are first conductor columns. One conductor column $13_4$ is detected as a touch point only in a state in which the conductive portion $11_2$ is being touched with a user's finger and is a second conductor column. One conductor column $13_5$ is detected as a touch point only in a state in which the conductive portion $11_3$ is being touched with a user's finger and is a second conductor column. One conductor column $13_6$ is detected as a touch point only in a state in which the conductive portion $11_4$ is being touched with a user's finger and is a second conductor column.

In this case, for example, in a state in which the knob 4 is not being grasped by the user, three first conductor columns $13_1$ to $13_3$ are detected as touch points. On the other hand, in a state in which the knob 4 is being grasped by the user, in addition to the three first conductor columns $13_1$ to $13_3$, second conductor columns whose number corresponds to the number of conductive portions being touched with user's fingers among the conductive portions $11_2$ to $11_4$ which are the upper-half portion are detected as touch points.

Here, the number of conductive portions being touched with user's fingers among the conductive portions $11_2$ to $11_4$ which are the upper-half portion varies depending on a state of grasping the knob 4 by the user (e.g., the number of fingers used to grasp). Namely, the knob 4 has a structure in which the number of touch points to be detected varies depending on a state of grasping by the user. Hence, it becomes also possible to determine a state of grasping the knob 4 by the user, on the basis of the number of touch points.

As described above, the operation input device 100 of the third embodiment includes the knob 4 for operations disposed in the display region of the touch display 1; the plurality of conductor columns 13 provided in the knob 4 and including a first conductor column that can be detected as a touch point regardless of whether or not the knob 4 is in a state of being touched with user's fingers, and a second conductor column that can be detected as a touch point only in a state in which the knob 4 is being touched with user's fingers; the touch point detecting unit 21 that detects a touch point corresponding to the first conductor column in a state in which the knob 4 is not being touched with user's fingers; a location determining unit 22 that determines a location of the first conductor column, using a result of the detection by the touch point detecting unit 21 in the state in which the knob 4 is not being touched with user's fingers; and the location estimating unit 23 that estimates a location of the second conductor column, using positional relationship information indicating a positional relationship between the plurality of conductor columns 13 in the knob 4 and location history information indicating a history of locations of the respective plurality of conductor columns 13, in the state in which the knob 4 is not being touched with user's fingers. By including the location estimating unit 23, a reduction in the accuracy of detection of a knob location can be suppressed despite the fact that some conductor columns (second conductor columns) among the plurality of conductor columns 13 are not detected as touch points in a state in which the knob 4 is not being touched with user's fingers.

Fourth Embodiment

Figure 18A:
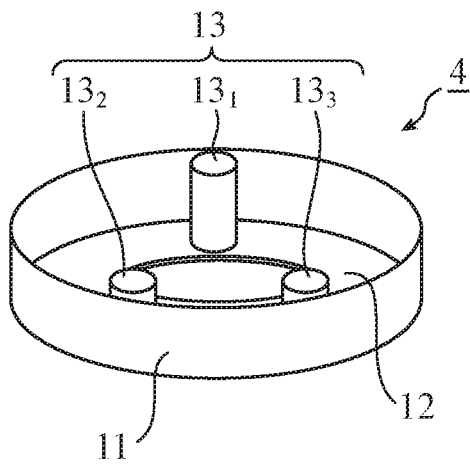
FIG. 18A is a perspective view showing the main part of a knob according to a fourth embodiment of the present invention.
Figure 18B:
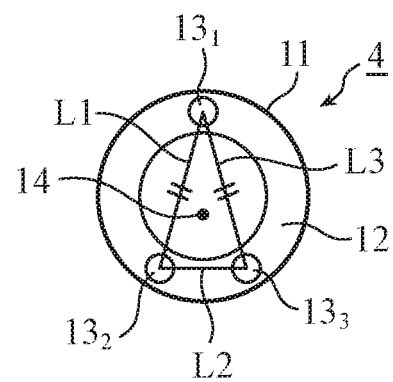
FIG. 18B is a plan view showing the main part of the knob according to the fourth embodiment of the present invention.
Figure 19:
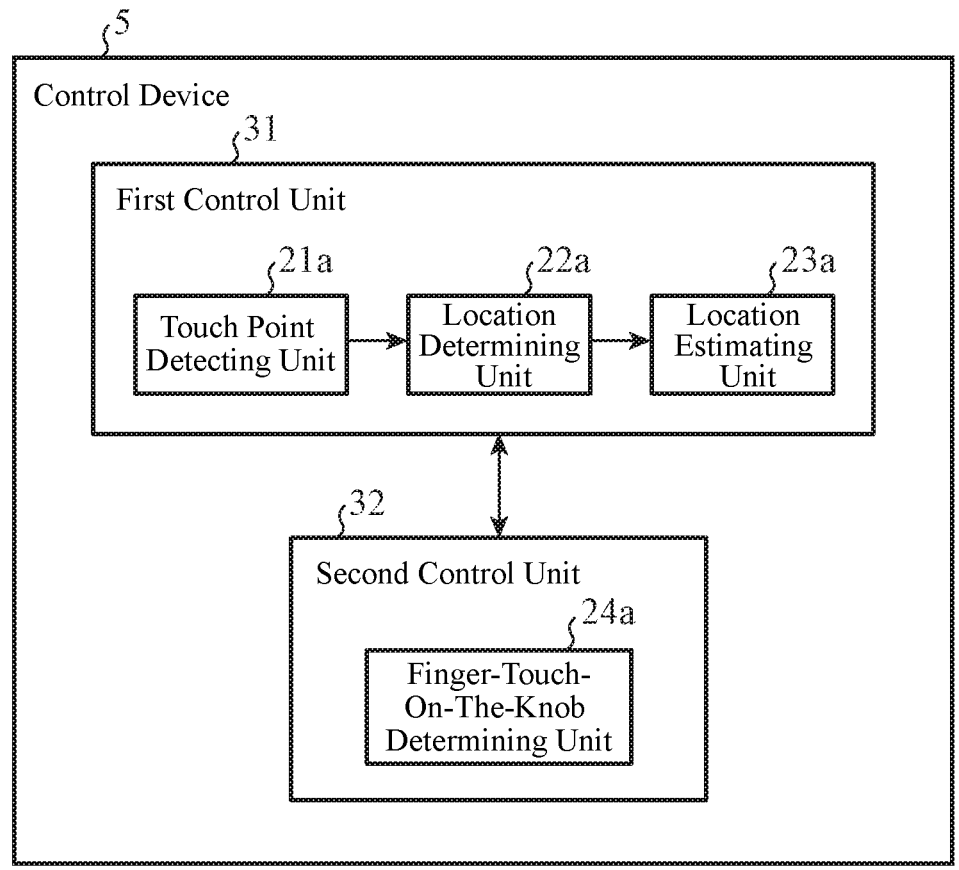
FIG. 19 is a block diagram showing the main part of a control device according to the fourth embodiment of the present invention.

FIG. 18A is a perspective view showing the main part of a knob according to a fourth embodiment. FIG. 18B is a plan view showing the main part of the knob according to the fourth embodiment. FIG. 19 is a block diagram showing the main part of a control device according to the fourth embodiment. With reference to FIGS. 18 and 19, an operation input device 100 of the fourth embodiment will be described.

Note that a hardware configuration of the operation input device 100 according to the fourth embodiment is the same as that described with reference to FIG. 1 in the first embodiment, and thus, FIG. 1 is incorporated, and description thereof is omitted. Note also that in FIG. 18, the same components, etc., as those shown in FIG. 2 are denoted by the same reference signs and description thereof is omitted. Note also that in FIG. 19, the same blocks as those shown in FIG. 8 are denoted by the same reference signs and description thereof is omitted.

A touch point detecting unit 21a has, in addition to a normal operating mode (hereinafter, referred to as "first operating mode"), an operating mode (hereinafter, referred to as "second operating mode") being higher in detection sensitivity than the first operating mode. The detection sensitivity for the first operating mode is equal to the detection sensitivity of the touch point detecting unit 21 of the first to third embodiments. In the second operating mode, for example, a so-called "glove mode" may be used.

Here, as shown in FIG. 18, three conductor columns $13_1$ to $13_3$ are disposed at locations corresponding to the respective vertices of an isosceles triangle. Hence, while L1≈L3, L2<L1 and L2<L3. Namely, two conductor columns $13_2$ to $13_3$ among the three conductor columns $13_1$ to $13_3$ are disposed close to each other.

In addition, the bottom area of each of the three conductor columns $13_1$ to $13_3$ is equal to the bottom area of the second conductor column shown in FIG. 12. Hence, if the touch point detecting unit 21a operates in the first operating mode regardless of whether or not the knob 4 is in a state of being touched with user's fingers, then the conductor columns 13 are detected as touch points only in a state in which the knob 4 is being touched with user's fingers.

However, in a state in which the knob 4 is not being touched with user's fingers, too, by the touch point detecting unit 21a operating in the second operating mode, with an improvement in detection sensitivity, it becomes possible to detect the conductor columns 13 as touch points. Note, however, that in this case, there is a possibility that one conductor column $13_1$ among the three conductor columns $13_1$ to $13_3$ is detected as a single touch point and two conductor columns $13_2$ to $13_3$ disposed close to each other are collectively detected as a single touch point.

Figure 20A:
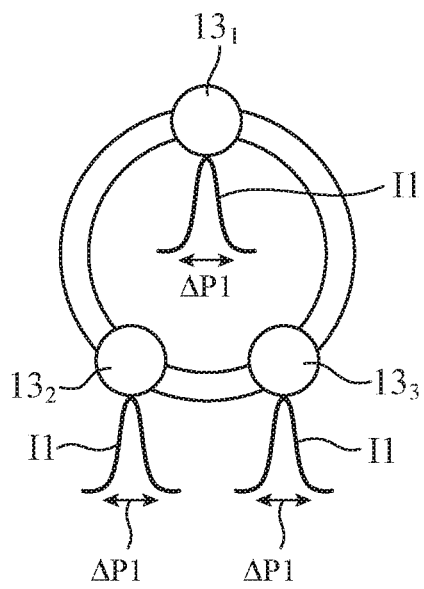
FIG. 20A is an explanatory diagram showing a situation in which each of three conductor columns is detected as a single touch point in a first operating mode in a state in which the knob is being touched with user's fingers.

FIG. 20A shows a state in which the knob 4 is being touched with user's fingers and the touch point detecting unit 21a is operating in the first operating mode. In the drawing, I1 represents an image of a waveform of a capacitance value which is detected due to the presence of the individual conductor columns 13. ΔP1 indicates the peak width of the waveform. In the state shown in FIG. 20A, the peak width ΔP1 is sufficiently small for the distance L2 between two conductor columns $13_2$ to $13_3$ disposed close to each other, and thus, each of the three conductor columns $13_1$ to $13_3$ is detected as a single touch point. In this case, by using touch point information, a location of each of the three conductor columns $13_1$ to $13_3$ can be determined.

Figure 20B:
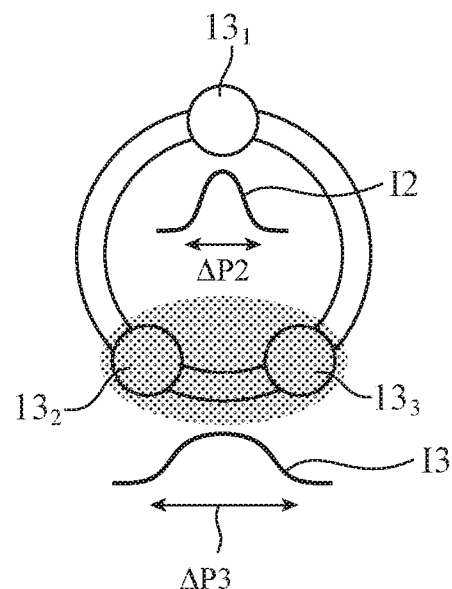
FIG. 20B is an explanatory diagram showing a situation in which two conductor columns disposed close to each other among the three conductor columns are collectively detected as a single touch point in a second operating mode in a state in which the knob is not being touched with user's fingers.

On the other hand, FIG. 20B shows a state in which the knob 4 is not being touched with user's fingers and the touch point detecting unit 21a is operating in the second operating mode. In the drawing, 12 represents an image of a waveform of a capacitance value which is detected due to the presence of the individual conductor columns 13. ΔP2 indicates the peak width of the waveform.

In an example shown in FIG. 20B, due to an improvement in detection sensitivity, ΔP2 is larger than ΔP1, and two conductor columns $13_2$ to $13_3$ disposed close to each other are collectively detected as a single touch point. In the drawing, 13 represents an image of a waveform of a capacitance value which is detected as the single touch point, and ΔP3 indicates the peak width of the waveform. As shown in FIG. 20B, ΔP3>ΔP2, and the area of a single touch point corresponding to the two conductor columns $13_2$ to $13_3$ is larger than the area of a single touch point corresponding to one conductor column $13_1$.

Even in such a case, by using touch point information, positional relationship information, and location history information, a location of each of the three conductor columns $13_1$ to $13_3$ can be estimated. For example, a location of the knob 4 on the display surface of the touch display 1 can be estimated using touch point information, and locations of the individual conductor columns 13 at the location of the knob 4 can be estimated using positional relationship information and location history information.

Based on the above-described description, the control device 5 of the fourth embodiment operates as follows.

Specifically, the touch point detecting unit 21a detects touch points in the first operating mode in a state in which the knob 4 is being touched with user's fingers and detects touch points in the second operating mode in a state in which the knob 4 is not being touched with user's fingers.

A location determining unit 22a determines a location of each of the three conductor columns $13_1$ to $13_3$, using touch point information outputted from the touch point detecting unit 21a (i.e., results of detection by the touch point detecting unit 21a), in the state in which the knob 4 is being touched with user's fingers.

A location estimating unit 23a estimates a location of each of the three conductor columns $13_1$ to $13_3$, using touch point information outputted from the touch point detecting unit 21a (i.e., results of detection by the touch point detecting unit 21a) and positional relationship information and location history information which are stored in the memory 7, in the state in which the knob 4 is not being touched with user's fingers.

A finger-touch-on-the-knob determining unit 24a determines whether the knob 4 is in a state of being touched with user's fingers, using the fact that when the touch point detecting unit 21a is operating in the first operating mode, the conductor columns 13 are detected as touch points only in a state in which the knob 4 is being touched with user's fingers. On the other hand, when the touch point detecting unit 21a is operating in the second operating mode, the conductor columns 13 are detected as touch points regardless of whether or not the knob 4 is in a state of being touched with user's fingers, and thus, the finger-touch-on-the-knob determining unit 24a determines whether the knob 4 is in a state of being touched with user's fingers, by the same method as that used by the finger-touch-on-the-knob determining unit 24 according to the second embodiment. These determinations use the most recent past determination results obtained by the location determining unit 22a or the most recent past estimation results obtained by the location estimating unit 23a.

Figure 21:
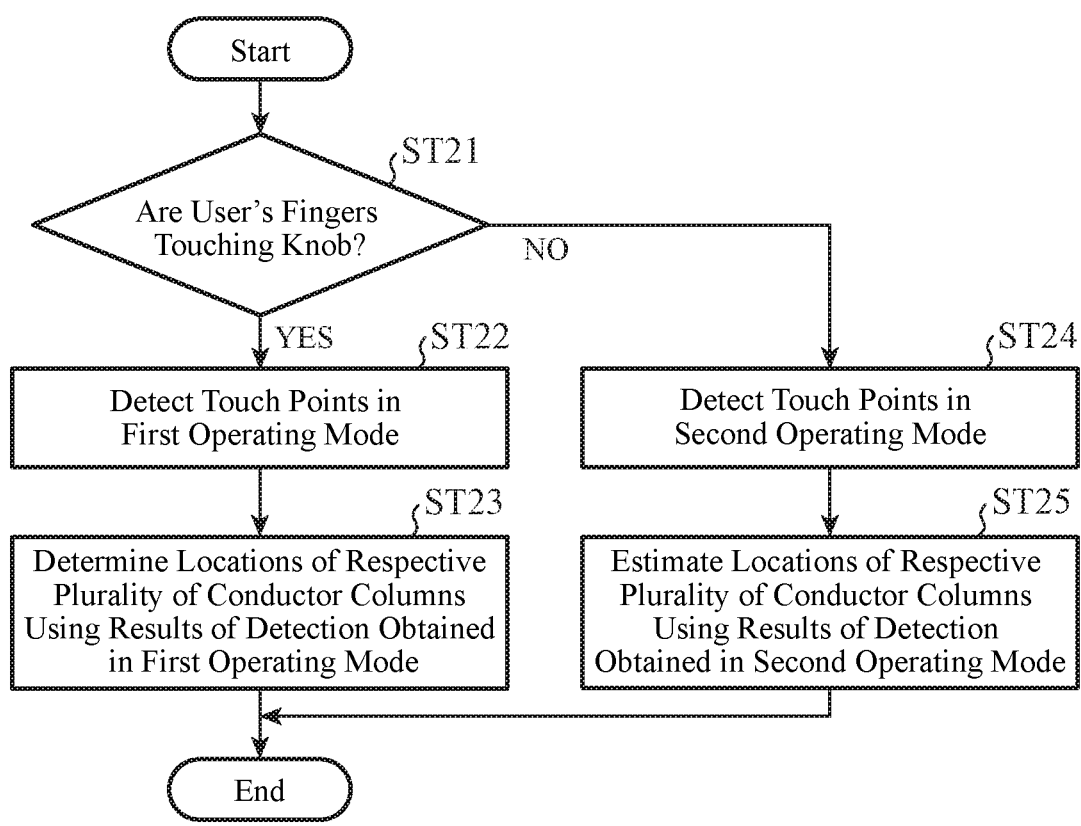
FIG. 21 is a flowchart showing the operation of the control device according to the fourth embodiment of the present invention.

Next, with reference to a flowchart of FIG. 21, the operation of the control device 5 according to the fourth embodiment will be described. The control device 5 according to the fourth embodiment repeatedly performs the following processes at step ST21 to ST25 at predetermined time intervals.

First, at step ST21, the finger-touch-on-the-knob determining unit 24a determines whether the knob 4 is in a state of being touched with user's fingers, using the most recent past determination results obtained by the location determining unit 22a or the most recent past estimation results obtained by the location estimating unit 23a. The finger-touch-on-the-knob determining unit 24a outputs a result of the determination to the touch point detecting unit 21a, the location determining unit 22a, and the location estimating unit 23a.

If the knob 4 is in a state of being touched with user's fingers ("YES" at step ST21), at step ST22 the touch point detecting unit 21a detects touch points in the first operating mode. Then, at step ST23, the location determining unit 22a determines a location of each of the three conductor columns $13_1$ to $13_3$, using touch point information outputted from the touch point detecting unit 21a.

On the other hand, if the knob 4 is in a state of not being touched with user's fingers ("NO" at step ST21), at step ST24 the touch point detecting unit 21a detects touch points in the second operating mode. Then, at step ST25, the location estimating unit 23a estimates a location of each of the three conductor columns $13_1$ to $13_3$, using touch point information outputted from the touch point detecting unit 21a and positional relationship information and location history information which are stored in the memory 7.

Note that the operation input device 100 of the fourth embodiment can adopt various variants which are similar to those described in the first embodiment. For example, the disposition of the conductor columns $13_1$ to $13_3$ is not limited to locations corresponding to the respective vertices of an isosceles triangle, and the number of the conductor columns 13 is not limited to three.

As described above, the operation input device 100 of the fourth embodiment includes the knob 4 for operations disposed in the display region of the touch display 1; the plurality of conductor columns 13 provided in the knob 4; the touch point detecting unit 21a that detects touch points corresponding to the plurality of conductor columns 13 in a first operating mode in a state in which the knob 4 is being touched with user's fingers, and detects touch points corresponding to the plurality of conductor columns 13 in a second operating mode that is higher in detection sensitivity than the first operating mode, in a state in which the knob 4 is not being touched with user's fingers; the location determining unit 22a that determines locations of the plurality of conductor columns 13 using results of the detection obtained in the first operating mode, in the state in which the knob 4 is being touched with user's fingers; and the location estimating unit 23a that estimates locations of the plurality of conductor columns 13 using results of the detection obtained in the second operating mode, in the state in which the knob 4 is not being touched with user's fingers. By including the location estimating unit 23a, a reduction in the accuracy of detection of a knob location can be suppressed despite the fact that locations of some conductor columns (two or more conductor columns which are collectively detected as a single touch point) among the plurality of conductor columns 13 cannot be accurately determined in a state in which the knob 4 is not being touched with user's fingers.

Note that in the invention of the present application, a free combination of the embodiments, modifications to any component of the embodiments, or omissions of any component in the embodiments are possible within the scope of the invention.

INDUSTRIAL APPLICABILITY

An operation input device according to the present invention can be used in an electronic device such as in-vehicle information device.

REFERENCE SIGNS LIST

1: Touch display,
2: Display,
3: Touch sensor,
4: Knob,
5: Control device,
6: Processor,
7: Memory,
11: Outer conductive portion,
12: Bottom plate,
13: Conductor column,
14: Hollow portion,
21 and 21a: Touch point detecting unit,
22 and 22a: Location determining unit,
23 and 23a: Location estimating unit,
24 and 24a: Finger-touch-on-the-knob determining unit,
31: First control unit,
32: Second control unit, and
100: Operation input device.

What is claimed is:

1. An operation input device comprising: a knob for operations, disposed in a display region of a touch display; a plurality of conductor columns provided in the knob; a processor to execute a program; and a non-transitory memory to store the program which, when executed by the processor, performs processes of, detecting a touch point corresponding to at least one of the conductor columns; determining a location of the at least one of the conductor columns, using a result of the detection by the processor; and estimating, when there is a conductor column that has not been detected as a touch point by the processor, a location of the conductor column that has not been detected as a touch point by the processor, using positional relationship information indicating a positional relationship between the plurality of conductor columns in the knob and location history information indicating a history of locations of the respective plurality of conductor columns.

2. The operation input device according to claim 1, wherein the processor estimates a location of a conductor column that has not been detected as a touch point by the processor in a state in which the knob is not being touched with user's fingers.

3. The operation input device according to claim 2, wherein each location indicated by the location history information is a location determined in past by the processor or a location estimated in past by the processor.

4. The operation input device according to claim 2, wherein the processor determines whether the knob is in a state of being touched with the user's fingers.

5. The operation input device according to claim 1, wherein each location indicated by the location history information is a location determined in past by the processor or a location estimated in past by the processor.

6. An operation input device comprising: a knob for operations, disposed in a display region of a touch display; a plurality of conductor columns provided in the knob and including a first conductor column that can be detected as a touch point regardless of whether or not the knob is in a state of being touched with user's fingers, and a second conductor column that can be detected as a touch point only in a state in which the knob is being touched with the user's fingers; a processor to execute a program; and a non-transitory memory to store the program which, when executed by the processor, performs processes of, detecting a touch point corresponding to the first conductor column in a state in which the knob is not being touched with the user's fingers; determining a location of the first conductor column, using a result of the detection by the processor in the state in which the knob is not being touched with the user's fingers; and estimating a location of the second conductor column, using positional relationship information indicating a positional relationship between the plurality of conductor columns in the knob and location history information indicating a history of locations of the respective plurality of conductor columns, in the state in which the knob is not being touched with the user's fingers.

7. The operation input device according to claim 3, wherein
the processor detects touch points corresponding to the first conductor column and the second conductor column in the state in which the knob is being touched with the user's fingers, and
the processor determines locations of the first conductor column and the second conductor column, using results of the detection by the processor in the state in which the knob is being touched with the user's fingers.

8. The operation input device according to claim 7, wherein each location indicated by the location history information is a location determined in past by the location determining unit or a location estimated in past by the processor.

9. The operation input device according to claim 7, wherein the processor determines whether the knob is in a state of being touched with the user's fingers.

10. The operation input device according to claim 3, wherein each location indicated by the location history information is a location determined in past by the processor or a location estimated in past by the processor.

11. The operation input device according to claim 3, wherein the processor determines whether the knob is in a state of being touched with the user's fingers.

12. An operation input device comprising: a knob for operations, disposed in a display region of a touch display; a plurality of conductor columns provided in the knob; a processor to execute a program; and a non-transitory memory to store the program which, when executed by the processor, performs processes of, detecting touch points corresponding to the plurality of conductor columns in a first operating mode in a state in which the knob is being touched with user's fingers, and detecting touch points corresponding to the plurality of conductor columns in a second operating mode in a state in which the knob is not being touched with the user's fingers, the second operating mode being higher in detection sensitivity than the first operating mode; determining locations of the respective plurality of conductor columns, using results of the detection obtained in the first operating mode, in the state in which the knob is being touched with the user's fingers; and estimating locations of the respective plurality of conductor columns, using results of the detection obtained in the second operating mode, in the state in which the knob is not being touched with the user's fingers.

13. The operation input device according to claim 5, wherein in the first operating mode, each of the plurality of conductor columns is detected as a single touch point, and in the second operating mode, two or more conductor columns are collectively detected as a single touch point, the two or more conductor columns being some of the plurality of conductor columns.

14. The operation input device according to claim 13, wherein the processor determines whether the knob is in a state of being touched with the user's fingers.

15. The operation input device according to claim 5, wherein the processor determines whether the knob is in a state of being touched with the user's fingers.

* * * * *